(12) United States Patent
Justin

(10) Patent No.: US 8,351,046 B2
(45) Date of Patent: Jan. 8, 2013

(54) MULTIPLE NESTED INTERFEROMETRIC FIBER OPTIC GYROSCOPE SYSTEM

(75) Inventor: Joseph Eugene Justin, Corona, CA (US)

(73) Assignee: The Boeing Company, Chicago, IL (US)

(*) Notice: Subject to any disclaimer, the term of this patent is extended or adjusted under 35 U.S.C. 154(b) by 875 days.

(21) Appl. No.: 12/240,574

(22) Filed: Sep. 29, 2008

(65) Prior Publication Data

US 2010/0079766 A1     Apr. 1, 2010

(51) Int. Cl.
*G01C 19/72* (2006.01)

(52) U.S. Cl. ....................................... 356/460
(58) Field of Classification Search ............. 356/460, 356/462, 459, 471, 465
See application file for complete search history.

(56) References Cited

U.S. PATENT DOCUMENTS

| | | | | |
|---|---|---|---|---|
| 4,712,306 A * | 12/1987 | Cahill et al. | ................ | 33/304 |
| 5,294,972 A * | 3/1994 | Kemmler | ................ | 356/462 |
| 5,357,339 A * | 10/1994 | Teraoka et al. | ................ | 356/462 |
| 5,552,887 A * | 9/1996 | Dyott | ................ | 356/465 |
| 5,854,678 A * | 12/1998 | Liu et al. | ................ | 356/462 |
| 6,038,025 A * | 3/2000 | Weed | ................ | 356/460 |
| 6,198,094 B1 * | 3/2001 | Freier et al. | ................ | 250/231.12 |
| 7,352,471 B2 * | 4/2008 | Truncale | ................ | 356/465 |
| 7,425,097 B1 * | 9/2008 | Chappell et al. | ................ | 384/109 |
| 7,712,223 B2 * | 5/2010 | Imamura et al. | ................ | 33/318 |
| 7,903,255 B2 * | 3/2011 | Kaplan | ................ | 356/460 |
| 2008/0285046 A1 * | 11/2008 | Fullerton | ................ | 356/459 |
| 2008/0291459 A1 * | 11/2008 | Meyer et al. | ................ | 356/462 |

FOREIGN PATENT DOCUMENTS

JP          61266911 A    * 11/1986

* cited by examiner

*Primary Examiner* — Tarifur Chowdhury
*Assistant Examiner* — Jonathan Hansen
(74) *Attorney, Agent, or Firm* — Klintworth & Rozenblat IP LLC

(57) ABSTRACT

A multiple nested interferometric fiber optic gyroscope system having varying functions may include a first fiber optic coil, a second fiber optic coil which is smaller than the first fiber optical coil and nested within and transversely to the first fiber optic coil, and a third fiber optic coil which is smaller than the second fiber optical coil and nested within and transversely to the second fiber optic coil.

21 Claims, 2 Drawing Sheets

MULTIPLE NESTED INTERFEROMETRIC FIBER OPTIC GYROSCOPE SYSTEM

FIELD OF THE DISCLOSURE

The disclosure relates to multiple nested interferometric fiber optic gyroscope systems having varying functions and to methods of their manufacture.

BACKGROUND OF THE DISCLOSURE

Many moving apparatus, such as aircraft, spacecraft, ships, missiles, rockets, satellites, vehicles, or other types of moving apparatus require guidance systems. Gyroscopes are sometimes used for this purpose. One prior art gyroscope disclosed by U.S. Pat. No. 7,352,471 utilizes a system embedded interferometric fiber optic gyroscope in which a coil, support optics, and electronic components are mounted on a frame which is then mounted directly to the system instrument mount. However, this prior art gyroscope only utilizes one coil size which does not allow for the flexibility of serving different functions. For instance, if the coil is small, it may be suitable for flight stability functions but not for gyrocompassing. Conversely, if the coil is large, it may be suitable for gyrocompassing. It may also be used for flight stability or another function but that would be an inefficient use of an expensive coil and make the system unnecessarily large. Another prior art gyroscope disclosed by U.S. Pat. No. 6,198,094 utilizes two nested coils of the same size and a third coil of the same size which is disposed in non-nested arrangement at the bottom of the two nested coils. However, this prior art gyroscope again only utilizes one coil size which does not allow for the flexibility of serving different functions, nor does it allow for instruments, such as accelerometers, to be disposed between the nested coils. Additionally, this prior art gyroscope is packaged in a strap-down cylinder and does not allow for the gyroscope to be packaged in a minimized, volume-saving sphere.

An interferometric fiber optic gyroscope and method of its manufacture is needed to decrease one or more problems associated with one or more of the existing fiber optic gyroscopes. In particular, a small, lightweight, accurate, interferometric fiber optic gyroscope is desired which is adapted to serve varying functions while being able to hold varying types of instruments.

SUMMARY OF THE DISCLOSURE

In one aspect of the disclosure, a nested interferometric fiber optic gyroscope system is disclosed. The system may comprise a first fiber optic coil, a second fiber optic coil which is smaller than the first fiber optical coil and nested within and transversely to the first fiber optic coil, and a third fiber optic coil which is smaller than the second fiber optical coil and nested within and transversely to the second fiber optic coil.

In another aspect of the disclosure, a method of manufacturing a nested fiber optic gyroscope system is disclosed. In one step, first, second, and third fiber optic coils may be provided which are each differently sized. In another step, the third fiber optic coil may be nested within and transversely to the second fiber optic coil. In still another step, the second fiber optic coil may be nested within and transversely to the first fiber optic coil.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
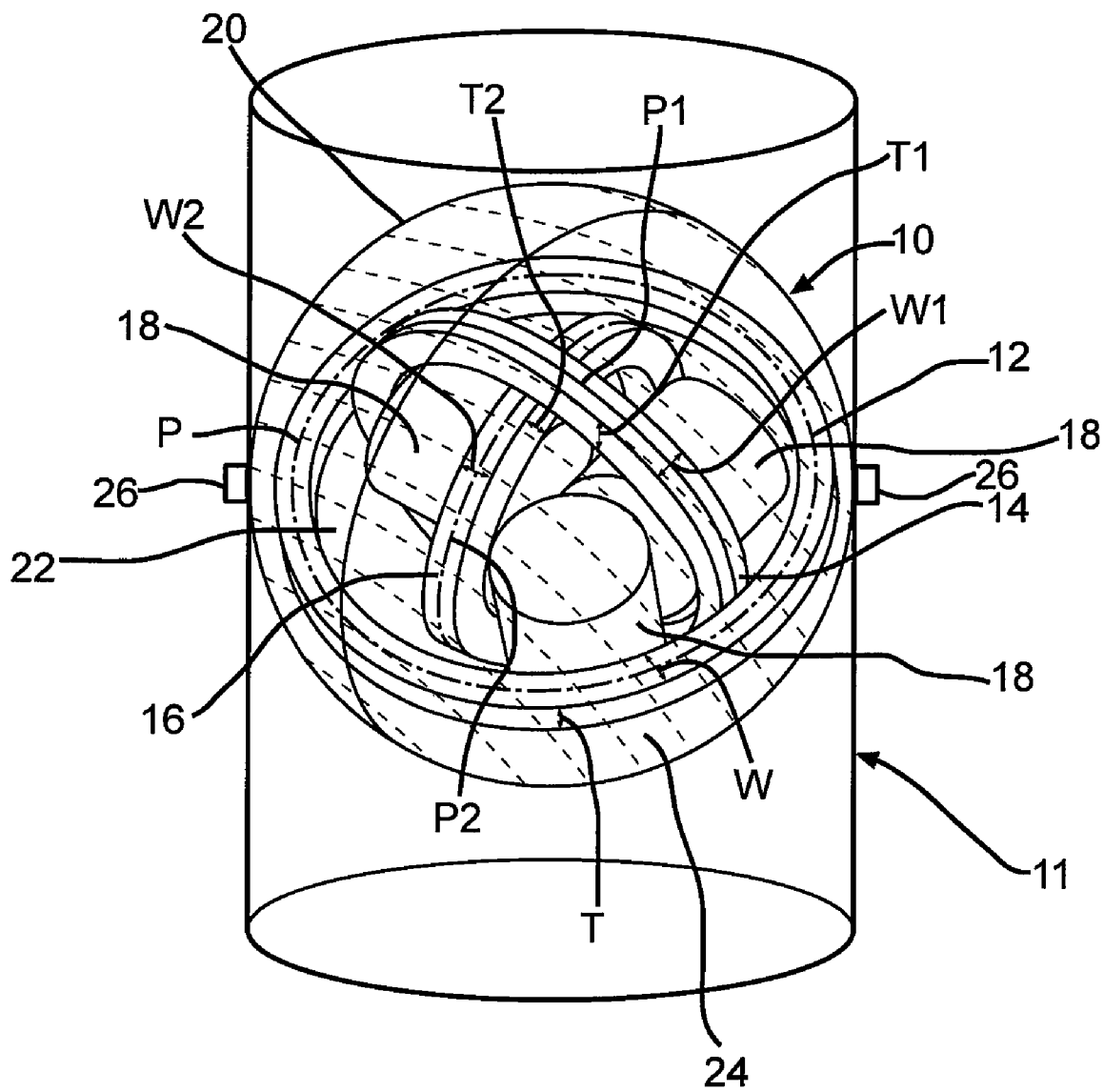
FIG. 1 shows a perspective, see-through view of one embodiment of a multiple nested interferometic fiber optic gyroscope system installed on an apparatus.

FIG. 1 shows a perspective, see-through view of one embodiment of a multiple nested interferometic fiber optic gyroscope system 10 installed on an apparatus 11 such as an aircraft, a spacecraft, a ship, a missile, a rocket, a satellite, a vehicle, or another type of apparatus. The system 10 may comprise a first fiber optic coil 12, a second fiber optic coil 14, and a third fiber optic coil 16. The first, second, and third fiber optic coils 12, 14, and 16 may be circular, elliptical, oblong, or in other shapes. Each of the first, second, and third fiber optic coils 12, 14, and 16 may be of different sizes. The perimeter dimensions (i.e. coil lengths) P, P1, and P2 of the first, second, and third fiber optic coils 12, 14, and 16 may be different. The width dimensions W, W1, and W2 of the first, second, and third fiber optic coils 12, 14, and 16 may be different. The thickness dimensions T, T1, and T2 of the first, second, and third fiber optic coils 12, 14, and 16 may be different. The second fiber optic coil 14 may be smaller than the first fiber optic coil 12, and the third fiber optic coil 16 may be smaller than the second fiber optic coil 14.

The second fiber optic coil 14 may be nested within (i.e. fully contained within) and transversely to the first fiber optic coil 12. The third fiber optic coil 16 may be nested within (i.e. fully contained within) and transversely to the second fiber optic coil 14. Each of the first, second, and third fiber optic coils 12, 14, and 16 may be disposed orthogonally to one another in nested arrangement Each of the first, second, and third fiber optic coils 12, 14, and 16 may be nested in concentric arrangement to one another. In other embodiments, any number of varying sized fiber optic coils may be nested together in varying configurations and orientations.

One or more instruments 18 may be disposed between at least two of the first, second, and third fiber optic coils 12, 14, and 16. The one or more instruments 18 may comprise an accelerometer, or other type of electronic instrumentation. A cover 20 may surround the first, second, and third fiber optic coils 12, 14, and 16 and the at least one instrument 18. The cover 20 may comprise a sphere having attached hemispheres 22 and 24. In other embodiments, the cover 20 may comprise any number of attached sections in different shapes and sizes. In still other embodiments, the cover 20 may comprise a non-spherical shape of different shapes and sizes. Each of the first, second, and third fiber optic coils 12, 14, and 16 may be fixedly attached to the cover 20 using fasteners 26 or other types of attachment mechanisms.

The cover 20 holding the system 10 may be attached fixedly via fastener(s) 26 or freely to the apparatus 11 and may be used to guide and/or to take movement measurements during motion of the apparatus 11. At least two of the first, second, and third fiber optic coils 12, 14, and 16 may be used for different functions. The first fiber optic coil 12 may be used for gyrocompassing, and each of the first, second, and third fiber optic coils 12, 14, and 16 may be used for stability control. In other embodiments, the first, second, and third fiber optic coils 12, 14, and 16 may be used for varying functions.

Figure 2:
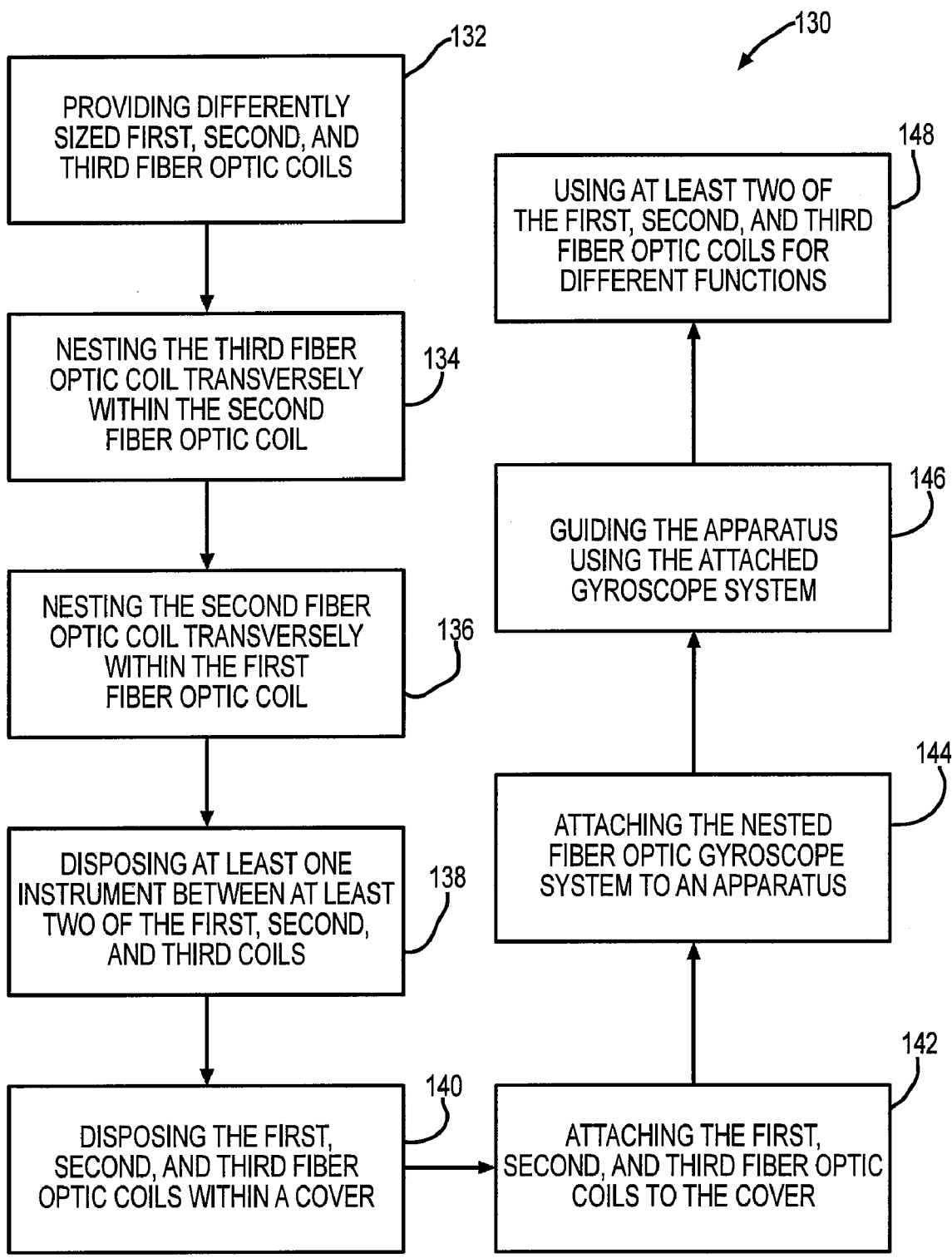
FIG. 2 is a flowchart of one embodiment of a method of manufacturing a multiple nested fiber optic gyroscope system.

FIG. 2 is a flowchart of one embodiment of a method 130 of manufacturing a multiple nested fiber optic gyroscope system 10. In one step 132, differently-sized first, second, and third fiber optic coils 12, 14, and 16 may be provided. The first fiber optic coil 12 may be larger than the second fiber optic coil 14 which may be larger than the third fiber optic coil 16. The first, second, and third fiber optic coils 12, 14, and 16 may be circular, elliptical, oblong, or in other shapes. The perimeter dimensions P, P1, and P2 of the first, second, and third fiber optic coils 12, 14, and 16 may be different. The width dimensions W, W1, and W2 of the first, second, and third fiber optic coils 12, 14, and 16 may be different. The thickness dimensions T, T1, and T2 of the first, second, and third fiber optic coils 12, 14, and 16 may be different.

In another step 134, the third fiber optic coil 16 may be nested within and transversely to the second fiber optic coil 14. In still another step 136, the second fiber optic coil 14 may be nested within and transversely to the first fiber optic coil 12. The nesting steps 134 and 136 may comprise nesting each of the first, second, and third optic coils 12, 14, and 16 orthogonally, and/or concentric to one another.

In yet another step 138, at least one instrument 18 may be disposed between at least two of the first, second, and third optic coils 12, 14, and 16. The disposed instrument 18 may comprise an accelerometer or another type of electronic instrumentation.

In an additional step 140, the first, second, and third fiber optic coils 12, 14, and 16 may be disposed within a cover 20. The cover 20 may be sphere-shaped and may comprise attached hemispheres 22 and 24. In other embodiments, the cover 20 may comprise any number of attached sections in differing shapes and sizes. In still other embodiments, the cover 20 may comprise a non-spherical shape in varying shapes and sizes. In still another step 142, each of the first, second, and third fiber optic coils 12, 14, and 16 may be attached to the cover 20.

In further steps 144 and 146, the nested fiber optic gyroscope system 10 may be attached to an apparatus 11, and used to guide and/or to take movement measurement for the apparatus 11. The apparatus 11 may comprise an aircraft, a spacecraft, a ship, a missile, a rocket, a satellite, a vehicle, or another type of apparatus. The system 10 may be attached to the apparatus 11 by fixedly and/or freely attaching the cover 20 holding the system 10 to the apparatus 11 using fasteners 26 or other types of attachment mechanisms.

In an additional step 148, at least two of the first, second, and third fiber optic coils 12, 14, and 16 may be used for different functions. The first fiber optic coil 12 may be used for gyrocompassing, and each of the first, second, and third fiber optic coils 12, 14, and 16 may be used for stability control. In other embodiments, the first, second, and third fiber optic coils 12, 14, and 16 may be used for still other types of functions. In still other embodiments, one or more of the steps 132-148 may be done in a different order, one or more of the steps may be skipped or altered, and/or one or more additional steps may be added.

One or more embodiments of the disclosure may be adapted to reduce one or more problems associated with one or more of the existing fiber optic gyroscopes in order to aide navigation of apparatus such as aircraft, spacecraft, ships, missiles, rockets, satellites, vehicles, or other types of moving apparatus requiring guidance systems. For instance, one or more embodiments of the disclosure may provide for a small, lightweight, accurate, interferometric fiber optic gyroscope in a volume-minimizing package, such as a sphere, which is adapted to serve varying functions having varied accuracies, due to the different sized nested coils, while being able to hold varying types of instruments, such as accelerometers.

It should be understood, of course, that the foregoing relates to exemplary embodiments of the disclosure and that modifications may be made without departing from the spirit and scope of the disclosure as set forth in the following claims.

I claim:

1. A nested interferometric fiber optic gyroscope system comprising:
    a first fiber optic coil;
    a second fiber optic coil which is smaller than the first fiber optic coil and nested within and transversely to the first fiber optic coil;
    a third fiber optic coil which is smaller than the second fiber optic coil and nested within and transversely to the second fiber optic coil;
    at least one instrument disposed inside the first fiber optic coil, the at least one instrument nested between the first and the second fiber optic coils, nested between the first and the third fiber optic coils, and nested between the second and the third fiber optic coils,
    a cover surrounding the first, second, and third fiber optic coils and the at least one instrument;
    wherein each of the first, second, and third fiber optic coils are concentric to one another; and
    wherein a plurality of instruments are disposed inside the first fiber optic coil, the plurality of instruments each being nested between the first and the second fiber optic coils, being nested between the first and the third fiber optic coils, and being nested between the second and the third fiber optic coils.

2. The nested interferometric fiber optic gyroscope system of claim 1 wherein each of the first, second, and third fiber optic coils are orthogonal to one another.

3. The nested interferometric fiber optic gyroscope system of claim 1 wherein the at least one instrument comprises an accelerometer.

4. The nested interferometric fiber optic gyroscope system of claim 1 wherein each of the first, second, and third fiber optic coils are fixedly attached to the cover.

5. The nested interferometric fiber optic gyroscope system of claim 1 wherein the nested interferometric fiber optic gyroscope system is attached to and used for guidance of at least one of an aircraft, a spacecraft, a ship, a missile, a rocket, a satellite, or a vehicle.

6. The nested interferometric fiber optic gyroscope system of claim 1 wherein the first, second, and third fiber optic coils are elliptical or oblong.

7. The nested interferometric fiber optic gyroscope system of claim 1 wherein the cover comprises two attachable and detachable hemispheres.

8. A method of manufacturing a nested fiber optic gyroscope system comprising:
    providing first, second, and third fiber optic coils which are each differently sized; nesting the third fiber optic coil within and transversely to the second fiber optic coil;
    nesting the second fiber optic coil within and transversely to the first fiber optic coil;
    disposing at least one instrument inside the first fiber optic coil so that the at least one instrument is nested between the first and the second fiber optic coils, nested between the first and the third fiber optic coils, and nested between the second and the third fiber optic coils, and disposing the first, second, and third fiber optic coils and the at least one instrument within a cover;

wherein the nesting steps further comprise nesting each of the first, second, and third fiber optic coils concentric to one another; and wherein the disposing step comprises disposing a plurality of instruments inside the first fiber optic coil so that the plurality of instruments are each nested between the first and the second fiber optic coils, nested between the first and the third fiber optic coils, and nested between the second and the third fiber optic coils.

9. The method of claim 8 wherein the nesting steps further comprise nesting each of the first, second, and third fiber optic coils orthogonally to one another.

10. The method of claim 8 wherein the at least one disposed instrument comprises an accelerometer.

11. The method of claim 8 further comprising the step of fixedly attaching each of the disposed first, second, and third fiber optic coils to the cover.

12. The method of claim 8 further comprising the steps of attaching the nested fiber optic gyroscope system to at least one of an aircraft, a spacecraft, a ship, a missile, a rocket, a satellite, or a vehicle, and using the nested fiber optic gyroscope system for guidance.

13. The method of claim 12 further comprising the step of the first fiber optic coil determining directional measurements and at least one of the second or third fiber optic coils determining angular measurements.

14. The method of claim 12 further comprising the step of the first fiber optic coil acting as a gyrocompass by determining directional measurements and at least one of the second or third fiber optic coils providing stability control by determining changes in angular motion to control angular motion stability.

15. The method of claim 8 wherein the provided first, second, and third fiber optic coils are each elliptical or oblong.

16. The method of claim 8 further comprising the step of attaching two hemispheres together to dispose the first, second, and third fiber optic coils and the at least one instrument within the cover.

17. A method of using a nested fiber optic gyroscope system comprising:

providing a nested fiber optic gyroscope system comprising: a first fiber optic coil; a second fiber optic coil which is smaller than the first fiber optic coil and nested within and transversely to the first fiber optic coil; a third fiber optic coil which is smaller than the second fiber optic coil and nested within and transversely to the second fiber optic coil; and at least one instrument disposed inside the first fiber optic coil, the at least one instrument nested between the first and the second fiber optic coils, nested between the first and the third fiber optic coils, and nested between the second and the third fiber optic coils, and a cover surrounding the first, second, and third fiber optic coils and the at least one instrument;

wherein each of the first, second, and third fiber optic coils are concentric to one another;

wherein a plurality of instruments are disposed inside the first fiber optic coil with the plurality of instruments each nested between the first and the second fiber optic coils, each nested between the first and the third fiber optic coils, and each nested between the second and the third fiber optic coils;

determining directional measurements with the first fiber optic coil; and determining angular measurements with at least one of the second or third fiber optic coils.

18. The method of claim 17 wherein the step of determining directional measurements with the first fiber optic coil further comprises the first fiber optic coil acting as a gyrocompass.

19. The method of claim 17 wherein the step of determining angular measurements with at least one of the second or third fiber optic coils further comprises at least one of the second or third fiber optic coils providing stability control by determining changes in angular motion to control angular motion stability.

20. The method of claim 17 wherein the at least one instrument comprises an accelerometer.

21. The method of claim 17 further comprising attaching the nested fiber optic gyroscope system to at least one of an aircraft, a spacecraft, a ship, a missile, a rocket, a satellite, or a vehicle, and using the nested fiber optic gyroscope system for guidance.

* * * * *